Feb. 27, 1973     R. E. BETTS     3,717,998
ROCKET MOTOR WITH COMBINED NOZZLE AND SUSPENSION PLATE
Filed June 3, 1971

Robert E. Betts,
INVENTOR.

United States Patent Office 3,717,998
Patented Feb. 27, 1973

3,717,998
ROCKET MOTOR WITH COMBINED NOZZLE AND SUSPENSION PLATE
Robert E. Betts, Huntsville, Ala., assignor to the United States of America as represented by the Secretary of the Army
Filed June 3, 1971, Ser. No. 149,432
Int. Cl. F02k 9/04
U.S. Cl. 60—255                        3 Claims

ABSTRACT OF THE DISCLOSURE

A solid propellant rocket motor that has a nozzle-suspension plate which incorporates a grain trap as an integral part of the nozzle. The nozzle-suspension plate has a plurality of nozzles through which exhaust gases are expended. A central exhaust nozzle provides exhaust for outer burning surfaces of propellant grains within the rocket motor and each individual nozzle around the central nozzle provides an exhaust nozzle for the inner burning surface of a respective propellant grain. With this arrangement, the nozzle areas to propellant burning surfaces are chosen such that the propellant grains have approximately a zero pressure differential across the grain at propellant burnout.

BACKGROUND OF THE INVENTION

In rocket motors where a cartridge type grain is used, particularly the multiple stick type, traps must be used to prevent the grain from exiting the motor and/or from plugging the nozzle. Such traps add additional weight to the motor and sometimes reduce the motor's performance by pressure drops across the trap. Therefore, there is a need for a combined trap and nozzle structure that will enable the rocket motor to be made smaller and shorter and yet have substantially the same or better performance.

Therefore, it is an object of this invention to provide a rocket motor in which the trap and nozzle structure have been integrated into a single unitary structure.

Another object of this invention is to provide a nozzle and trap structure in which the pressure differential across hollow cylindrical propellant sticks of the rocket motor can be held to a minimum at grain burnout or break-up.

A further object of this invention is to provide a combined trap and nozzle structure which enables a minimum motor length rocket to be produced which rocket uses a hollow cylindrical stick type propellant grain.

DETAIL DESCRIPTION OF THE INVENTION

Figure 1:
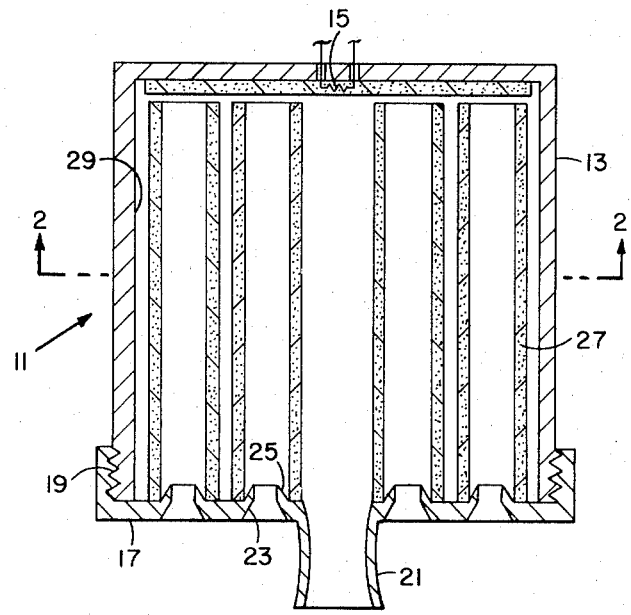
FIG. 1 is a sectional view through a rocket motor according to this invention.
Figure 2:
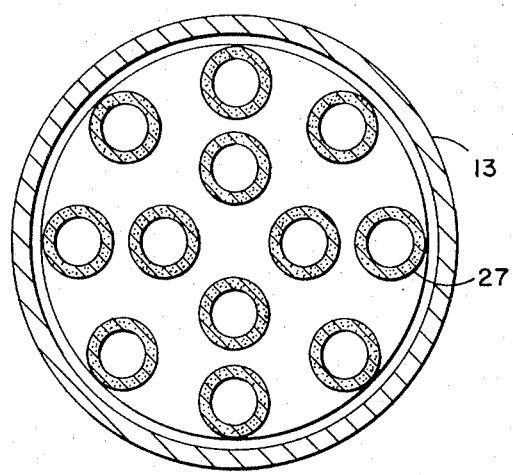
FIG. 2 is a sectional view taken along line 2—2 of FIG. 1.

Referring now to FIG. 1 of the drawing, rocket motor 11 includes a motor case 13 with a conventional igniter 15 at the head end of the motor case. Unitary rocket nozzle and trap or support plate 17 is secured to motor case 13 in a conventional manner such as by thread means 19 as illustrated. Unitary rocket nozzle and support plate 17 has a central exhaust nozzle 21 and a plurality of circumferentially arranged secondary rocket nozzles 23. At the forward end of each secondary rocket nozzle 23 is nozzle-pin projections 25 for supporting and confining hollow cylindrical stick type propellant grains 27 within chamber 29 of rocket motor case 13. That is, each nozzle-pin projects far enough into the propellant grain so that the distance between the forward end of the propellant grain and the motor head end of chamber 29 is less than the protrusion of the nozzle pin into the rear end of the propellant grain. Thus the grain cannot slip off the nozzle-pin and is thereby always properly oriented in a predetermined position within chamber 29.

For optimum operation of the rocket motor, the ratio of the inside surface of each propellant grain to the nozzle throat area of each secondary nozzle 23 should be equal to the ratio of the total outside surface areas of the propellant grains to the throat area of centrally arranged nozzle 21, i.e.

$S_1$ = inside surface of stick grain 27
$S_2$ = outside surface of stick grain 27
$A_{T_1}$ = throat area of secondary nozzle 23
$A_{T_2}$ = throat area of centrally arranged nozzle 21.

The ideal situation is then $$\frac{S_1}{A_{T_1}} = \Sigma \frac{S_2}{A_{T_2}}$$

The above ratio can be made to occur at grain burnout. Therefore, at this point the pressure differential across each propellant grain is zero, giving minimum grain break-up.

In operation, rocket motor 11 is fired up by igniting initiator 15 that in turn ignites the outer and inner surfaces of propellant grains 27. The exhaust gases from the burning inner surfaces of the propellant grains exhaust out their respective secondary nozzle 23 and the exhaust gases produced by the burning outer surfaces of the propellant grains exit out central exhaust nozzle 21. By having secondary exhaust nozzles 23 predeterminately arranged relatively to the central exhaust nozzle 21 such as by being circumferrentially arranged relative to exhaust nozzle 21, a balanced thrust from the rocket motor is obtained.

I claim:
1. A rocket motor comprising: a motor case having a chamber therein; an igniter mounted at the forward end of said motor case; a combined nozzle and suspension plate secured to the aft end of said motor case, said combined nozzle and support plate having a centrally arranged exhaust nozzle and a plurality of secondary exhaust nozzles arranged about said central exhaust nozzle, each of said secondary nozzles having a nozzle-pin projection that projects into said motor chamber; and hollow cylindrical type stick propellant grains positioned in said chamber with one end of each grain inserted over its respective nozzle-pin projection so as to be confined in said motor chamber in a predetermined arrangement.

2. A rocket motor as set forth in claim 1, wherein said secondary exhaust nozzles are circumferrentialy arranged about said central exhaust nozzle.

3. A rocket motor as set forth in claim 2, wherein the ratio of the inside surface of each propellant grain to its respective secondary nozzle throat area is equal to the ratio of the total outside surface areas of the propellant grains to the throat area of the centrally arranged exhaust nozzle.

References Cited

UNITED STATES PATENTS

| 2,515,048 | 7/1950 | Lauritsen | 60—256 X |
| 2,976,805 | 3/1961 | Africano et al. | 60—263 X |
| 3,070,955 | 1/1963 | Kallin et al. | 60—39.47 X |
| 3,185,036 | 5/1965 | Oeland | 60—253 X |
| 3,401,525 | 9/1968 | Schubert et al. | 60—255 |

CARLTON R. CROYLE, Primary Examiner
M. KOCZO, Jr., Assistant Examiner

U.S. Cl. X.R.
60—263